United States Patent
Lodde et al.

(10) Patent No.: US 10,351,734 B2
(45) Date of Patent: *Jul. 16, 2019

(54) HIGHLY ABRASION-RESISTANT TECHNICAL ADHESIVE TAPE WITH DOUBLE-LAYER LINER

(71) Applicant: Coroplast Fritz Müller GmbH & Co. KG, Wuppertal (DE)

(72) Inventors: Christoph Lodde, Holzwickede (DE); Gülay Wittig, Bochum (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 432 days.

This patent is subject to a terminal disclaimer.

(21) Appl. No.: 14/436,593

(22) PCT Filed: Oct. 16, 2013

(86) PCT No.: PCT/EP2013/071595
§ 371 (c)(1),
(2) Date: Apr. 17, 2015

(87) PCT Pub. No.: WO2014/060457
PCT Pub. Date: Apr. 24, 2014

(65) Prior Publication Data
US 2016/0168427 A1  Jun. 16, 2016

(30) Foreign Application Priority Data

Oct. 17, 2012 (DE) .................. 20 2012 103 975 U
Nov. 9, 2012 (EP) ..................................... 12192017

(51) Int. Cl.
*B32B 5/02* (2006.01)
*B32B 7/12* (2006.01)
(Continued)

(52) U.S. Cl.
CPC .............. *C09J 7/29* (2018.01); *B32B 5/024* (2013.01); *B32B 7/12* (2013.01); *B32B 27/12* (2013.01);
(Continued)

(58) Field of Classification Search
CPC ........ B32B 2307/402; B32B 2307/554; B32B 5/024; B32B 27/308; B32B 27/12;
(Continued)

(56) References Cited

U.S. PATENT DOCUMENTS 6,265,460 B1 * 7/2001 Kawate ..................... C09J 7/10
522/31
2004/0152384 A1 * 8/2004 Ommerborn .......... D04B 21/20
442/151

(Continued)

FOREIGN PATENT DOCUMENTS

CN    101840750 A1    9/2010
DE     19732958 A1    2/1999
(Continued)

OTHER PUBLICATIONS

Chinese Examination Report—dated Apr. 27, 2016.
(Continued)

*Primary Examiner* — Jennifer A Chriss
*Assistant Examiner* — Rebecca Janssen
(74) *Attorney, Agent, or Firm* — Brinks Gilson & Lione

(57) ABSTRACT

An abrasion-resistant adhesive tape (1), that can be formed into a roll, preferably a cable winding tape (1), with a strip-shaped double-layer substrate (2) with a pressure-sensitive adhesive coating (3) on one side. The substrate (2) having a first textile fabric layer (4) and a second textile fabric layer (5), being permanently connected by an adhesive connection layer (6). For a high abrasion resistance, preferably a class-E abrasion resistance according to LV (Continued)

312, and enabling easy processing with a minimal thickness, the first and second textile layers (4) each have a basis weight ranging from 80 to 300 g/m², the adhesive connection layer (6) having a basis weight ranging from 50 to 300 g/m² and a laminate adhesive force, by DIN EN 1939, between the textile layers greater than 10 N/cm.

33 Claims, 1 Drawing Sheet

(51) Int. Cl.
| | | |
|---|---|---|
| C09J 7/29 | (2018.01) | |
| D03D 1/00 | (2006.01) | |
| B32B 27/12 | (2006.01) | |
| B32B 27/30 | (2006.01) | |
| B32B 27/32 | (2006.01) | |
| D03D 15/00 | (2006.01) | |
| D03D 13/00 | (2006.01) | |

(52) U.S. Cl.
CPC .......... *B32B 27/306* (2013.01); *B32B 27/308* (2013.01); *B32B 27/32* (2013.01); *D03D 1/00* (2013.01); *D03D 13/008* (2013.01); *D03D 15/00* (2013.01); *B32B 2262/0276* (2013.01); *B32B 2307/102* (2013.01); *B32B 2307/402* (2013.01); *B32B 2307/50* (2013.01); *B32B 2307/554* (2013.01); *B32B 2307/5825* (2013.01); *B32B 2307/7242* (2013.01); *B32B 2405/00* (2013.01); *B32B 2605/00* (2013.01); *C09J 2201/122* (2013.01); *C09J 2201/16* (2013.01); *C09J 2201/606* (2013.01); *C09J 2203/302* (2013.01); *C09J 2400/263* (2013.01); *C09J 2433/006* (2013.01); *C09J 2467/006* (2013.01); *D10B 2331/04* (2013.01); *D10B 2505/00* (2013.01)

(58) Field of Classification Search
CPC ......... B32B 27/306; B32B 27/32; B32B 7/12; B32B 2307/102; B32B 2262/0276; B32B 2307/50; B32B 2307/5825; B32B 2307/7242; B32B 2405/00; B32B 2605/00; D10B 2505/00; D10B 331/04; D10B 2231/04; Y10T 442/3472; D03D 13/008; D03D 15/00; D03D 1/00; C09J 7/29; C09J 2433/006; C09J 2201/606; C09J 2201/16; C09J 2201/122; C09J 2203/302; C09J 2400/263; C09J 2467/006
USPC .............. 442/343, 268, 239, 255, 261, 293, 442/149–151; 174/72; 428/343
See application file for complete search history.

(56) References Cited

U.S. PATENT DOCUMENTS

| | | | | |
|---|---|---|---|---|
| 2007/0173156 | A1* | 7/2007 | Kulper | B32B 7/12 442/286 |
| 2010/0048074 | A1* | 2/2010 | Wahlers-Shcmidlin | C09J 7/04 442/60 |
| 2011/0070393 | A1* | 3/2011 | Kopf | C09J 7/21 428/68 |
| 2011/0111665 | A1* | 5/2011 | Lodde | C09J 7/04 442/220 |
| 2011/0250448 | A1* | 10/2011 | Jones | C08L 23/12 428/359 |
| 2012/0279637 | A1* | 11/2012 | Siebert | C09J 7/045 156/185 |
| 2015/0298422 | A1* | 10/2015 | Lodde | B32B 5/00 428/193 |

FOREIGN PATENT DOCUMENTS

| | | |
|---|---|---|
| EP | 1 911 824 A1 | 7/2007 |
| EP | 1990393 A1 | 11/2008 |
| EP | 2 230 737 A1 | 2/2010 |
| JP | H0870526 A | 3/1996 |

OTHER PUBLICATIONS

PCT International Search Report—dated Dec. 16, 2013.
Wikipedia, "Schmelzklebstoff," https://de.wikipedia.org/wiki/Schmelzklebstoff, Mar. 4, 2019, 5 pages. English Translation Provided, "Melt Adhesive," 7 pages.
VBNT: The virtual education network for textile professions, Tensile strength of fabrics, 2003 University of Hannover, Germany, Professor Dr. Ralf-D. Reumann, "Strip Tensile," Testing of according to DIN EN ISO 13934-1, 2 pages (English Translation Provided, 3 pages).
"Self-Adhesive Tapes," Determination of Peel Adhesion Properties, English Version of DIN EN 1939, Dec. 2003, 17 pages (page 17 blank).

\* cited by examiner

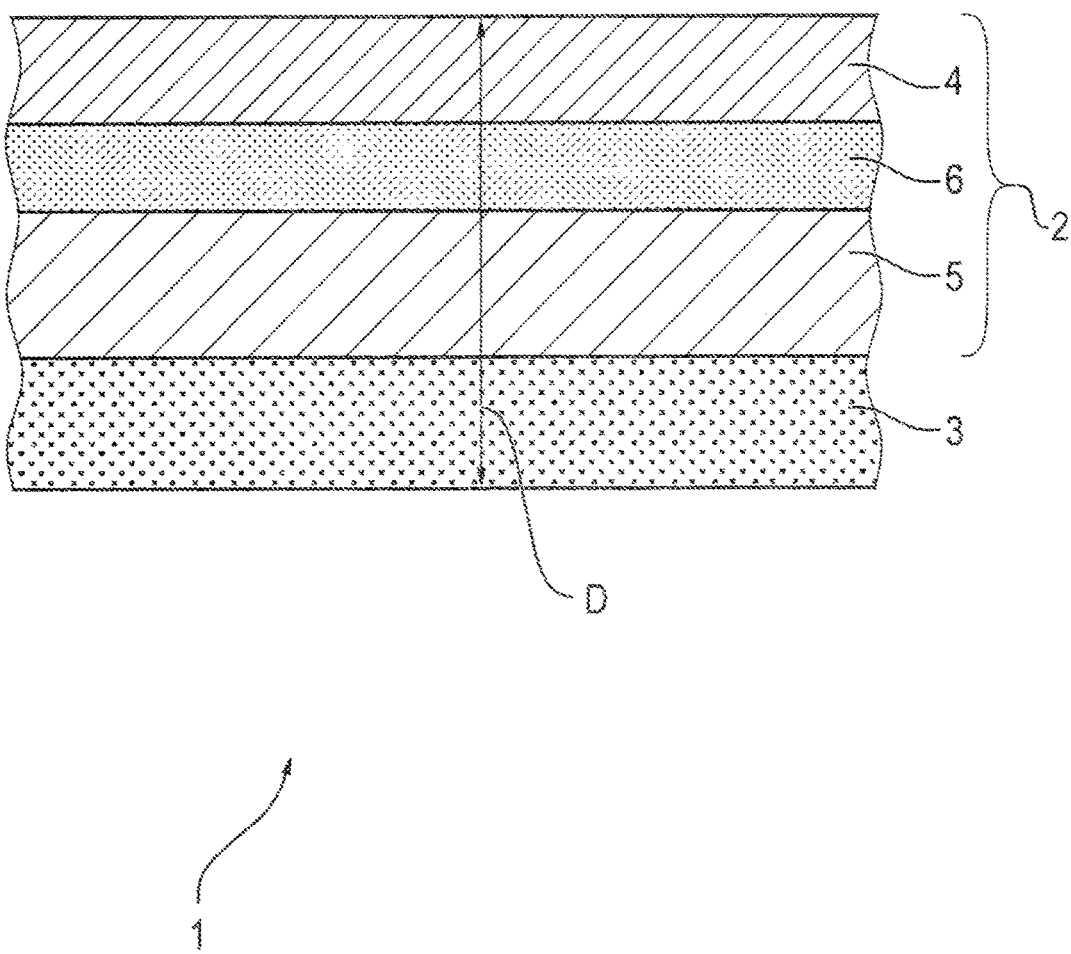

HIGHLY ABRASION-RESISTANT TECHNICAL ADHESIVE TAPE WITH DOUBLE-LAYER LINER

CROSS-REFERENCE TO RELATED APPLICATIONS

This application claims priority to German Patent Application No. 20 2012 103 975.3, filed on Oct. 17, 2012, European Patent Application No. 12192917.7, filed on Nov. 9, 2012, and PCT/EP2013/071595, filed on Oct. 16, 2013.

FIELD OF THE INVENTION

The invention relates to a highly abrasion-resistant technical adhesive tape, in particular one that is rollable onto itself into an adhesive tape roll, preferably a cable wrapping tape, including a double-layer band-type substrate, which is provided on one side with a pressure-sensitive adhesive layer, wherein the substrate having a first textile layer with a fabric and second textile layer, the two layers being fixed to each other across their entire surface by an adhesive connection layer.

BACKGROUND

In the automotive sector, cable sets are often wrapped with adhesive tapes, wherein mainly textile adhesive tapes, in addition to the pure bundling function, have also assumed numerous additional functions, such as the protection of the cables from abrasion or the damping of rattling- or vibration noises. Here the use of both fabric adhesive tapes and various non-woven adhesive tapes is widespread.

The different requirements imposed on adhesive tapes run in part contrary to each other with respect to certain basic parameters of the adhesive tape, such as, for example, their thickness. Thus, assuming that other basic parameters, such as the substrate material, remain constant, in an adhesive tape of increasing thickness, although it might have a higher abrasion resistance, a limited flexibility and a deterioration in flagging behavior must also be expected. Thus, in practice, in order to meet the different demands, numerous technical solutions for adhesive tapes have been proposed according to which, as a rule, one, and in some cases also two or more of the required properties have been assigned particular importance, whereas other properties have become less important.

An adhesive tape of the above-mentioned type is known from DE 20 2005 013 009 U1, and includes a textile substrate made from at least one fabric layer and a fabric layer formed in particular from a velour or fleece and an adhesive layer applied to one or both sides of the substrate, wherein the fabric layer is configured as a fine-woven fabric layer having more than 25 threads/cm in the longitudinal and transverse directions. In addition to an advantageously high abrasion resistance, the known tape has, however, the disadvantageous properties that it is not machine-processable and shows a flagging on the cable set, so that its ends must be fixated each time it is used.

A double-layer adhesive tape of the above-mentioned type is also known from WO 2005/085379 A1. In this document, in particular, a highly abrasion-resistant and noise-dampening adhesive tape is described for the bandaging of cable harnesses, particularly in automobiles, which includes a substrate with a first cover layer. The first cover layer is formed of a velour, scrim, fabric, or knit, made in particular from a PET filament fabric or a polyamide fabric. The first cover layer is fixedly connected to a further layer, which is made of a porous fabric, such a textile having an open but stable three-dimensional structure, or a foam or a foamed film. This layer can have, in particular, in the sense of a desired high noise-damping, a high basis weight of up to 500 g/m$^2$, in particular a preferred basis weight in the range of 150 to 300 g/m$^2$. The additional layer can, on the other hand, be fixedly connected over its entire surface on its open side to an optionally present third layer designated as the second cover layer, which preferably—like the first cover layer—is composed of a velour, scrim, fabric, or knit, made in particular from a PET filament fabric or a polyamide fabric. The surface fusion of the first cover layer, possibly the second cover layer, and the additional layer, which is connected to the first cover layer or optionally also to the second cover layer, can be accomplished by using a laminating adhesive, or in a tack-free manner, by mechanical bond formation, such as meshing, overstitching, needling, or hydroentanglement. In one embodiment of the known tape, abrasion resistances according to ISO 6722 with a weight load of 10 N of over 8,000 double strikes on a 10 mm mandrel were measured. It is also disadvantageous, with this known tape, that it is not mechanically processable and has a high band thickness.

The object of the present invention is to provide an adhesive tape of the above-described type having a double-layer substrate, which, with high abrasion resistance, in particular with an abrasion resistance according to class E according to LV 312, which is preferably determined on a 5 mm mandrel, is easily processable both manually and by machine, and which has a minimal thickness. The inventive adhesive tape, which preferably has a rot-proof substrate, should also be pliant and flexible, display an improved flagging behavior compared to adhesive tapes according to the prior art, and have a high adhesive strength.

SUMMARY AND INTRODUCTORY DESCRIPTION OF THE INVENTION

The above described object is inventively achieved in accordance with this invention in that the second textile layer is formed of a fabric wherein the fabric of the first textile layer and the fabric of the second textile layer each have a basis weight in the range of 80 g/m$^2$ to 300 g/m$^2$, wherein the adhesive connection layer has a basis weight in the range of 50 g/m$^2$ to 300 g/m$^2$ and wherein a laminate adhesive force, determined according to DIN EN 1939, between the first textile layer and the second textile layer of the substrate is greater than 10 N/cm.

With the inventive adhesive tape, dispensing with a fabric layer connected to the first textile layer which is formed of an open three-dimensional structure such as a fleece or a foam with minimal thickness of the inventive adhesive tape, excellent values for abrasion resistance are achieved; in particular an abrasion resistance according to class E according to LV 312 is achieved.

In the automobile industry, the testing of adhesive tapes for the wrapping of cable sets is for the most part done according to extensive standards, such as those summarized, for example, in LV 312 "Adhesive tapes for cable sets in motor vehicles" (1/2005) as common inspection guidelines of the companies Audi, BMW, DC, and VW. With respect to abrasion resistance, the classification provided in LV 312 is reproduced in the following Table 1.

TABLE 1

Classification of abrasion classes according to LV 312

| Abrasion class | Requirement (number of strokes) |
| --- | --- |
| A - no abrasion protection | <100 |
| B - slight abrasion protection | 100-499 |
| C - moderate abrasion protection | 500-999 |
| D - high abrasion protection | 1000-4999 |
| E - very high abrasion protection | 5000-14,999 |
| F - extremely high abrasion protection | 15,000-29,999 |
| G - abrasion protection for special applications | ≥30,000 |

For testing, a mandrel is used that has either a diameter of 10 mm or a diameter of 5 mm. With the same number of strokes achieved up to the abrasion limit, here the abrasion resistance on the 5 mm mandrel is higher, since with a given abrasion resistance, on a mandrel of this kind, the abrasion limit is reached sooner—i.e. already with a lower number of strokes—than on the 10 mm mandrel. It is thus possible that a fabric that achieves an abrasion resistance according to a certain class on a mandrel having a 10 mm diameter must be classified one class lower according to the test on the 5 mm mandrel. However, this is not the case with an inventive adhesive tape: the abrasion class E is achieved both on the 10 mm mandrel and on the 5 mm mandrel.

In the cited guidelines, for example, testing methods for thermal resistance, compatibility of adhesive tapes with electrical vehicle cables and those for chemical resistance, noise damping behavior, fogging- and flagging-behavior are described as additional application-relevant tests. "Flagging" is understood here as meaning a loosening, in particular helically, of tape wrapped around a cable set, so that the tape ends protrude, and that in order to prevent this, the ends must in each case be fixated when tape is used.

An inventive adhesive tape is significantly more pliant than the above-described known adhesive tapes, has a much lower tendency toward flagging, and can be processed both manually and mechanically. The advantageousness of the invention is particularly apparent when the substrate comprises a rot-resistant textile substrate, such as, for example, a polyester fabric, whereby in particular, in addition to the desired abrasion resistance, a high tensile strength can also be ensured. Due to these properties the inventive adhesive tape is highly suitable for wrapping cable sets.

Here the inventive adhesive tape can have, in particular, an optimally low thickness of less than 0.5 mm, preferably a thickness in the range of 0.35 mm to 0.48 mm, particularly preferably in the range of 0.44 mm to 0.46 mm.

Here the adhesive connection layer can advantageously be formed of a hot-melt adhesive, in particular a hot-melt adhesive that is predominantly composed of an ethyl acrylate copolymer, such as an ethylene butyl acrylate or an ethylene-ethyl acrylate, or predominantly of an ethylene-vinyl acetate copolymer (EVA), wherein the respective copolymer is preferably modified with UV-crosslinkable acrylic hardeners and/or polymerized UV-C photo reactive groups, in particular in the side chain.

The adhesive contributes on the one hand to abrasion resistance, and on the other hand, jet coating of the substrate and manufacture of the inventive adhesive tape using conventional hot-melt coaters is possible, such hot-melt coaters usually being designed for dispersion- and solvent-based-adhesives.

The adhesive can be applied, in particular, in a pressure-less coating method, such as the so-called "curtain-coating method." According to this method a closed adhesive film falls on the substrate. In this way a uniform thickness and thus grammage of the adhesive layer is achieved. Only as much adhesive is applied as is absolutely necessary. In this way, the basis weight of the adhesive connection layer can inventively be precisely adjusted in the range of 50 to 150 g/m$^2$, as well as the basis weight preferably in the range of 70 g/m$^2$ to 130 g/m$^2$, preferably 80 g/m$^2$ to 100 g/m$^2$. The grammage of the adhesive connection layer and of the adhesive layer can be adjusted to the same size.

Advantageously, with increasing basis weight in the inventively claimed range, the bond using the mentioned hot-melt adhesive, compared to the use of the other mentioned adhesives, also causes a disproportionate increase in the abrasion resistance.

For polyester fabric substrates in particular, inventively preferred thread constructions with 45 warp threads and 25 weft threads can be used, wherein the use of preferred similar threads in warp and weft with a fineness of 167 dtex, each of which is composed of the same number, in particular each of a number of 36 filaments, has a particularly favorable effect on an increased abrasion resistance. In general, however, a fineness in the range of 110 dtex to 550 dtex for the warp and weft threads and a number in the range of 24 to 144 filaments per thread is possible, whereby, however, with an increasing number of filaments, it has to be assumed that there will be a reduction in abrasion resistance.

The use of textured threads also has the advantageous effect of increasing abrasion resistance. In the textile industry, "texturing" refers to a process by which the chemical fibers are permanently curled. With this processing, the synthetic filaments assume a character similar to that of natural filaments and acquire a textile feel. The texturing usually takes place under the influence of heat and pressure, whereby a thermoplasticity of the filaments is exploited. Due to a crimping of the filaments during texturing, fiber loops are generated, which result in a volume increase, whereby the elastic stretchability increases as the thermal conductivity decreases.

For carrying out the texturing, various, in particular mechanical, mechanical-thermal, and chemical-thermal processes are known. Thus with the so-called false twisting method, a thread is twisted with up to 1000 turns/m and heat-fixed. After the turning back, a fixed spiral structure is retained in the individual filaments. In stuffer box crimping a fiber bond is pressed through heated rollers into a chamber having walls disposed in a wedge shape and thereby compressed and crimped, whereby the crimping is fixed by the chamber heat. In jet texturing, a filament yarn is guided through a jet though which compressed air is simultaneously pressed. Upon exiting from the nozzle, the air swirls, in this way partially releasing the yarn into its individual filaments and looping it again, after which a concluding stabilization occurs in a fixing zone, which is also associated with hardening and shrinking.

In addition, it can also advantageously also be provided that in the fabric of the first textile layer and/or in the fabric of the second textile layer, the warp threads and/or the weft threads are respectively intermingled, whereby in particular 82 to 86 intermingling points per meter are present. The intermingling—also called interlacing—is an additional fitting of the filaments, wherein the filaments are selectively interwoven by a swirling with air. Here the cohesion of the individual filaments is not achieved by means of a turning but rather by an entangling of the filaments. The intermingling can be carried out with smooth threads, but it is also possible, and inventively preferred, to carry out an intermingling in direct connection with a texturing of the threads.

BRIEF DESCRIPTION OF THE DRAWINGS

Further advantageous design features of the invention are contained in the following description. The invention is explained in more detail based on the inventive exemplary embodiment illustrated by the accompanying drawing, and two comparative examples.

The drawing shows an embodiment of an inventive adhesive tape in a cross-sectional view.

FURTHER DESCRIPTION OF THE INVENTION

As the drawing illustrates, an inventive highly abrasion-resistant technical adhesive tape 1, in particular a cable wrapping tape 1 for an automobile, windable on itself without interliner, includes a band-shaped, double-layer substrate 2, which is provided on at least one side with a self-adhesive adhesive layer 3, which is formed of a pressure-sensitive adhesive. Known adhesives are usable here as "pressure-sensitive adhesives," in particular UV-crosslinkable adhesives (with properties as presented below, for example, in Table 2), whereby these require no further modification.

The support 2 includes a first textile layer 4 made of a fabric and a second textile layer 5, the two layers being permanently connected to each other across their entire surface by an adhesive connection layer 6. It is provided that the second textile layer 5 is also formed of a fabric, wherein the fabric of the first textile layer 4 and the fabric of the second textile layer 5 each have a basis weight in the range of 80 g/m² to 145 g/m².

Preferably the fabric of the second textile layer 5 can be the same fabric as in the first textile layer 4, in particular a fabric that is formed of polyester fibers composed of up to 100 percent polyethylene terephthalate (PET). Such a fabric forms a rot-proof substrate 2 and can in particular respectively have a basis weight in the range of 90 g/m² to 135 g/m², preferably of 130 g/m².

The inventive adhesive connection layer 6 has a basis weight in the range of 50 to 150 g/m², whereby here, values in the range of 70 g/m² to 130 g/m² are preferred.

The adhesive coating 3 can in particular be formed of an acrylate or acetate adhesive, preferably a hot-melt adhesive as is also used to produce the adhesive connection layer 6. Such a hot-melt adhesive can be manufactured based on an ethyl acrylate copolymer, such as an ethylene butyl acrylate or an ethylene-ethyl acrylate, or predominantly based on an ethylene-vinyl acetate, i.e. predominantly formed of these polymers, wherein the polymers are preferably modified with UV-crosslinkable acrylic hardeners and/or can contain polymerized UV-C photo reactive groups, in particular in the side chain.

Here a typical formulation can, for example, be composed of 60 percent by mass up to 96 percent by mass UV crosslinkable acrylate hardener (e.g. acResin® A260 UV from the firm BASF SE, specific information thereof below in Table 2), of 2 percent by mass up to 20 percent by mass EVA (e.g. Evatane® from the firm Arkema, specific information thereof in Table 3) or ethyl acrylate (e.g. Lotryl® EH, a static copolymer of ethylene and 2-ethylhexyl acrylate, or Lotryl® BA, a static copolymer of ethylene and butyl acrylate also of the firm Arkema, specific information for Lotryl® below in Table 4) as well as of 2 percent by mass up to 20 percent by mass of a hydrogenated rosin (rosin: 2R,3S,4S,5R,6R)-2-methylol-6-[(E)-3-phenylallyloxy]tetrahydropyrane-3,4,5-triol, e.g. Foral™ 105-E of the firm Eastmann having specific properties according to Table 5).

The latter is a thermoplastic, made from pentaerythritol and from highly stabilized, hydrogenated rosin ester hardener for adhesives and coatings. Its use offers excellent advantages in a function as a tackifier or as a modifier resin in the adhesive. Foral™ resin here causes an excellent resistance to oxidation and discoloration caused by heat and aging.

TABLE 2

Specific data of a butyl-acrylate-based UV-crosslinkable acrylate with polymerized photoinitiator

|  | Unit | Range |
| --- | --- | --- |
| Nonvolatile components | % | 99%-100% |
| K-value | — | 48-52 |
| Color number | — | 0-100 |
| Viscosity | Pas | 40-60 |

TABLE 3

Specific data of an ethylene-vinyl acetate

|  | Unit | Range |
| --- | --- | --- |
| MFI | g/10 min | 2.5-1000 |
| Melting point | ° C. | 55-90 |
| Shore-A hardness | — | 40-100 |

TABLE 4

Specific data for ethylene-butyl acrylate or ethylene-ethyl-hexyl acrylate (Lotryl ® EH or BA)

|  | Unit | Range |
| --- | --- | --- |
| MFI | g/10 min | 100-1000 |
| Melting point | ° C. | 65-75 |
| Shore-A hardness | — | 45-75 |

TABLE 5

Specific data for Foral ™ 105-E

|  | Unit | Range |
| --- | --- | --- |
| Melt viscosity | mPas |  |
| 120° C. |  | 20,000 |
| 140° C. |  | 2000 |
| 160° C. |  | 410 |
| Melting point | ° C. | 85-120 |
| Density at 25° C. | kg/dm³ | 1.06 |

The parameters in the above tables were determined as follows:
Non-volatile percentages according to DIN EN ISO 3251,
K-value according to DIN EN ISO 1628-1, by 1% (m/v) in THF,
Color number according to DIN EN 6271-2 (Hazen)
Viscosity according to Viscosity Physica MC101 (oscillation) 100 1/s 130° C., Carreau-Gahleitner,
Melt flow index MFI (Tables 3 and 4) according to ISO 1133 or ASTM D 1238,
Melting point by differential scanning calorimetry (DSC),
Shore A hardness according to ASTM D 2240,
Melt viscosity according to ASTM D 3835,
Density according to ASTM D 1505.
Here the following should be noted: the K-value determination is a generally accepted test method for determining intrinsic viscosity, whereby the determined value is an indirect measure of the molecular weight. The color number according to DIN EN 6271 part 2 is a measure of the contamination of the butyl acrylate, which can arise during the polymerization. This parameter has only a subordinate significance with respect to the invention. The determination of the viscosity according to Physica MC 101 is an internal test method of BASF, the results of which differ in only insignificant ways from those of other comparable test methods—such as with cone-plate systems or plate-plate systems.

The adhesive coating 3 and/or the adhesive connection layer 6 can each have a basis weight in the range of approximately 50 g/m² to 150 g/m², preferably of 80 g/m² to 100 g/m². The application on the substrate can occur in a technologically advantageous manner by using the above-mentioned curtain-coating method.

The determination of the basis weights of the adhesive coating 3 and/or of the adhesive connection layer 6, as well as of the two textile layers 4, 5 formed of fabric, occurs here in the usual manner according to the standard DIN EN ISO 2286-2 "Rubber- or plastics-coated fabrics—Determination of roll characteristics—Part 2: Methods for determination of total mass per unit area, mass per unit area of coating and mass per unit area of substrate."

With an optimally small thickness of less than 0.5 mm, preferably with a thickness in the range of 0.35 to 0.48 mm, especially preferably in the range of 0.44 mm to 0.46 mm, the inventive adhesive tape 1 here achieves an abrasion resistance according to LV 312 of at least class E, in particular an abrasion resistance in the range from 7500 to 9200 strokes, determined on a 5 mm mandrel.

Here the inventive adhesive tape is manually and mechanically processable, and according to LV 312 advantageously has a temperature stability of 125° C. or more.

With a high pliability and flexibility of the inventive adhesive tape 1 a bond strength between the first textile layer 4 and the second textile layer 5 of the substrate 2 can be adjusted that is sufficient so that during processing, in particular during a pulling-off from an adhesive tape roll, or even optionally during redetachment from an unwound state, such as on a cable harness, a delamination of the layers 4, 5 does not result.

Here a laminate adhesive force, determined according to DIN EN 1939, between the first textile layer 4 and the second textile layer 5 of the substrate 2 is greater than 10 N/cm and preferably falls within the range of 12 N/cm to 15 N/cm, while an adhesive force determined according to DIN EN 1939 on the tape back is less than the laminate adhesive force between the layers 4, 5 and in particular can fall within the range of 4.0 N/cm to 15.0 N/cm, preferably 5.5 N/cm to 8.0 N/cm. Here an unwinding force determined according to DIN EN 1944 can, in particular, fall within the range of 2 N to 10 N, preferably 3 N to 7 N.

Here, advantageously high adhesive forces are achievable using the inventive adhesive tape 1. Thus, with a test according to DIN EN 1939, the adhesive force on steel can assume values within the range of 5.0 N/cm to 15.0 N/cm, preferably 7.5 N/cm to 9.0 N/cm.

Typical preferred values for two preferred embodiments a) and b) of the fabric structure and the characteristics of the fiber material of an inventive adhesive tape 1 can be seen in Table 6 below.

TABLE 6

| Fabric structures | | |
|---|---|---|
| Feature | Unit | Property/Value |
| Substrate material | — | Polyester fabric |
| Basis weight | g/m² | 130 |
| Fiber type | — | 100% polyester |
| Warp | | |
| Thread count | 1/cm | 45 |
| Yarn type | — | Filament, intermingled, textured, spin-dyed |
| Filament count | | 36 |
| Yarn strength | dtex | 167 |
| Width-based thread strength | dtex/cm | >7000 |
| Weft | | |
| Thread count | 1/cm | a) 25 - b) 22 |
| Yarn type | — | Filament, intermingled, textured, spin-dyed |
| Filament count | | 36 |
| Yarn strength | dtex | 167 |
| Width-based thread strength | dtex/cm | a) >3800<br>b) >3000 |

With the kind of fabrics used for both the first textile layer 4 and the second textile layer 5 in an inventive adhesive tape 1, the technical properties reproduced in Table 7 below can be achieved.

TABLE 7

| Comparison of technical data of an inventive PET fabric-composite adhesive tape | | | |
|---|---|---|---|
| Test | Unit | Finding | Comparison |
| Thickness | mm | 0.44-0.45 | 1.0-1.1 |
| Elongation at break | % | 23-31 | 25-28 |
| Tensile strength | N/cm | 371-421 | 250-290 |
| Adhesive force - steel | N/cm | 7.5-9.5 | 4.3-8.1 |
| tape backs | N/cm | 5.5-8.0 | 3.0-6.9 |
| Unwinding force | N/19 mm | 3-7 | 3-7 |
| Flagging - 30 min | mm | 0-1 | 0-1 |
| 24 h | mm | 0-1 | 0-1 |
| Abrasion 5 mm mandrel | strokes | 7500-9200 | 5300-6200 |
| Laminate adhesive force | N/cm | 12-15 | 6-8 |
| Noise damping | Class | B | E |
| Substrate color | — | black and/or white | black |
| Substrate weight | | | |
| first layer | g/m² | 130 | 120 |
| second layer | g/m² | 130 | 230 |
| Basis weight | | | |
| Adhesive coating (pressure-sensitive adhesive) | g/m² | 100 | 130 |
| Adhesive connection layer (Laminate pressure-sensitive adhesive) | g/m² | 100 | 100 |

The corresponding parameter values are compared to those of a conventional adhesive tape having a two-layer substrate made from a PET fabric layer and a fleece layer.

The noise damping according to LV 312 specified in Table 7 of class B means that there is a noise damping in the range of 2 dB (A) to 5 dB (A) according to LV 312.

In addition to the above-mentioned high abrasion resistance, the inventive adhesive tape 1 also has high tensile strength, as expressed in values that fall within the range of 300 N/cm to 600 N/cm, preferably 370 N/cm to 421 N/cm, in a test according to DIN EN 14410. The elongation at break, as indicated in Table 7, fell within the range of 23 percent to 31 percent. It should preferably be greater than 20 percent.

Comparing the parameters listed in Table 7 of the inventive adhesive tape 1 to an additional known conventional adhesive tape (not listed in the table with respect to its properties), which is formed of the same substrate material but has only one-layer, wherein it is provided with an adhesive coating having a grammage in the range of approximately 80 g/m$^2$ to 85 g/m$^2$, the following surprising synergistic facts appear in the inventive tape.

While the known tape including a one-layer substrate has a thickness (measured according to DIN 1942) in kicked the range of 0.24 mm to 0.25 mm, the inventive adhesive tape 1 has a thickness D that is less than double the thickness of the one-layer tape. Here the above-mentioned tensile strength values according to Table 3 are also less than double the tensile strength of the known tape. The latter fall—with an elongation at break in the range of 35 percent to 40 percent—within the range of 270 N/cm to 315 N/cm in a test according to DIN EN 14410.

However, at the same time, the abrasion resistance values of the inventive adhesive tape 1 advantageously amount to those mentioned in Table 3, but are disproportionately higher than those of the one-layer tape, which, with an achieved stroke count according to LV 312 of 1050 to 1200—i.e. less than a seventh or eighth of the inventive adhesive tape 1—has to be assigned to abrasion class D.

Here the variation in the adhesive strength of the known tape is, with values of 4.0 N/cm to 14.1 N/cm on steel (difference of range limits: 10.1 N/cm) and 6.0 N/cm to 12.8 N/cm (difference of range limits: 6.8 N/cm), much greater than in the inventive adhesive tape 1, where the range boundaries of the adhesive strength corresponding to Table 3 are only spaced by 2.0 N/cm—measured on steel—and only by 2.5 N/cm—measured on the tape back. The adhesive force is consequently advantageously much more subtly adjustable with the inventive adhesive tape 1, i.e. within narrower limits. Here the unwinding force of the known one-layer tape falls within the same range as that of the inventive tape.

In view of the basis weights of the adhesive coating 3 and the adhesive connection layer 6 listed in Table 7, it can be noted that in the depicted exemplary embodiment these both lie at a consistent 100 g/m$^2$. Nevertheless, the laminate adhesive force—determined according to DIN 1939—of the inventive adhesive tape 1 between the first textile layer 4 and the second textile layer 5 of the substrate 2 is greater than the adhesive force on the tape back determined according to the same standard. This is necessary so that a pulling-off of the adhesive tape 1 from the roll does not result in a delamination of the layers 4, 5. Here the comparatively greater laminate adhesive force can be achieved by a stronger crosslinking of the adhesive in the adhesive connection layer 6, for example due to a higher radiation power of a UV source used for this purpose, by a temperature elevated by 50° C. to 140° C. with respect to room temperature, or by a pressure increased by 0.05 bar to 6.0 bar with respect to atmospheric pressure during the laminating process of the textile layers 4, 5, or by a formula of the adhesive in the adhesive connection layer 6 deviating from the adhesive formula in the adhesive coating 3.

As mentioned above, adhesives for UV crosslinking are available from the firm BASF SE under the trademark acResin®. The polymer chains of the acrylates contained in these adhesives are manufactured from the same acrylate monomers as are found in dispersion- and solvent-based acrylate pressure-sensitive adhesive systems. With irradiation with UV-C light (250-260 nm), however, polymerized UV-C reactive groups are excited to crosslinking reactions with adjacent acrylate chains. Such crosslinking here occurs very quickly but in a precisely controllable manner and takes place only as long as the UV light is applied. The polymerized photoreactive groups of the polymer, in particular those located in the side chains of the acResin®, react here with any C—H group of a neighboring chain. The crosslinking rate thereby lies typically in the range between 20 mJ/cm$^2$ and 85 mJ/cm$^2$, wherein the irradiation and crosslinking performance, depending on the UV lamp is in general in a range between 50 W/cm$^2$ and 900 W/cm$^2$. In this way, the crosslinking structure characteristic of pressure-sensitive adhesives is produced. A typical magnitude of the adhesive strength of an adhesive coating 3 that can be adjusted in this manner is approximately 6 N/cm according to DIN 1939. By modifying such an acResin® adhesive with resin and/or sealable elastomers, particularly with those mentioned above having the properties listed in Tables 3 to 5, relatively higher laminate adhesive forces can be adjusted—particularly in the inventively provided adhesive connection layer 6—in particular adhesive forces that are greater than 10 N/cm according to DIN 1939.

Table 8 below illustrates the influence of the modification of an acResin® adhesive with resin and/or sealable elastomers on the formation of the laminate adhesive force and the abrasion resistance. In both cases fabric structures were used as shown in Table 6 (fabric in weft according to a)). Adhesive application weight and degree of crosslinking were also equal in both cases.

TABLE 8

Comparison of laminate adhesive force and abrasion resistance with the use of a modified and an unmodified acrylate adhesive

|  | Unit | Modified acrylate adhesive | Unmodified acrylate adhesive |
| --- | --- | --- | --- |
| Adhesive application weight | g/m$^2$ | 100 | 100 |
| Degree of crosslinking | mJ/cm$^2$ | 35 | 35 |
| Laminate adhesive force | N/cm | 11.0-13.0 | 1.5-3.0 |
| Abrasion resistance | Strokes | 5200-6700 | 2500-3500 |

As can be seen in Table 8, the modified acrylate adhesive has significant advantages with respect to the laminate adhesive force since a higher substrate-material bond is effected. With the use of the modified acrylate adhesive a higher abrasion resistance is also achieved. If an unmodified acrylate adhesive is used, then under the same conditions there is only a very slight laminate adhesion force. In the present exemplary embodiment this is, in particular, up to 70 percent less, which results in the bond produced also showing a significantly lower abrasion resistance in the abrasion test.

Deviating from the data for the exemplary embodiment depicted in Table 7 different adhesive forces—with the same, or also with different adhesive formulas—can of course also be adjusted in the adhesive coating 3 and in the adhesive connection layer 6 by means of correspondingly differently selected adhesive grammages. Thus the application of adhesive in the adhesive layers 3, 6 can be correspondingly freely combined within the indicated ranges and preferred ranges, whereby in each case it can be ensured that the mentioned laminate adhesive force of more than 10 N/cm according to DIN 1939 is present in the adhesive connection layer 6.

As is already apparent from the above, the invention is not limited to the exemplary embodiments shown and described, but rather also includes all embodiments that work the same way in the sense of the invention.

Thus, for example, in the exemplary embodiments in the fabrics of the first textile layer 4 and/or in the fabrics of the second textile layer 5, the warp threads and the weft threads respectively are designed as identical, which has a positive effect concerning a high abrasion resistance, which however is not required in every case.

Furthermore it is preferably possible—as indicated in Table 2—to both manufacture the substrate 2 from a spin-dyed yarn or thread material and subject the substrate 2 to dispersion dyeing. Here, preferred color combinations produced by the use of suitable pigments—preferably in polyester material—in the textile layers 4, 5 of an inventive adhesive tape 1 are black/black, black/white, and white/white. Such coloring corresponds to the term "black and/or white" in Table 3. The textile fabric layers 4, 5 respectively can also have the same or different colors.

If necessary, the titer of the threads and thus also of the width-related thread thickness of the warp threads and/or the length-related thread thickness of the weft threads—respectively determined by multiplication of the respective thread count per length unit by the respective titer of the thread—can deviate from the values given in Table 6.

The person skilled in the art can also supplement the invention with additional advantageous technical measures without leaving the context of the invention. Thus, for example, a calendering of the substrate 2 or the first textile layer 4 and/or the second textile layer 5 prior to its lamination promotes a reduction in the permeability of the fabric to the adhesive in the adhesive layer 3 and/or in the adhesive connection layer 6. This is seen in the way the air-permeability of the fabric, measured according to DIN 53 887 at a test pressure of 500 Pa can preferably be smaller than 200 l/m²s and specifically amount to approximately 50 l/m²/s. Even with a potentially lower viscosity of the adhesive during the application of the adhesive, there is no penetration of the adhesive through the substrate 2.

While the above description constitutes the preferred embodiment of the present invention, it will be appreciated that the invention is susceptible to modification, variation and change without departing from the proper scope and fair meaning of the accompanying claims.

The invention claimed is:

1. A highly abrasion-resistant adhesive tape, which can be rolled into an adhesive tape roll, for use as a cable wrapping tape, comprising:
    a strip-shaped double-layer substrate with a pressure-sensitive adhesive coating on one side, wherein the substrate comprises a first textile layer of a fabric and a second textile layer, the first textile layer and the second textile layer comprising polyester fibers,
    in the fabric of the first textile layer or in a fabric of the second textile layer warp threads or weft threads respectively have a linear density in the range of 110 dtex to 550 dtex,
    in the fabric of the first textile layer or in the fabric of the second textile layer the warp threads and/or the weft threads are respectively composed of a number of filaments in the range of 24 to 144,
    the textile layers being permanently connected to each other over their entire surface by an adhesive connection layer, wherein the fabric of the first textile layer and the fabric of the second textile layer each have a basis weight in the range of 80 g/m² to 300 g/m², and wherein the adhesive connection layer has a basis weight in the range of 50 g/m² to 300 g/m²,
    wherein the tape has a thickness of less than 0.5 mm, an abrasion resistance according to LV 312 of at least class E, and a laminate adhesive force determined according to DIN EN 1939 between the first textile layer and the second textile layer of the substrate is greater than 10 N/cm,
    wherein the adhesive connection layer is comprised of a hot-melt adhesive formed of an ethyl acrylate copolymer or of an ethylene-vinyl acetate copolymer (EVA), wherein the copolymer is modified with UV-crosslinkable acrylic hardeners or polymerized UV-C photoreactive groups.

2. The adhesive tape according to claim 1, wherein the fabric of the second textile layer is the same fabric material as the fabric of the first textile layer.

3. The adhesive tape according to claim 1, wherein the fabric of the first textile layer or the fabric of the second textile layer each have a basis weight in the range of 100 g/m² to 170 g/m².

4. The adhesive tape according to claim 1, wherein the fabric of the first textile layer or the fabric of the second textile layer each consists of polyethylene terephthalate.

5. The adhesive tape according to claim 1, wherein the adhesive connection layer has a basis weight in the range of 80 g/m² to 150 g/m².

6. The adhesive tape according to claim 1, wherein the hot-melt adhesive includes an ethylene butyl acrylate or an ethylene-ethyl acrylate, wherein the acrylate is modified with UV-crosslinkable acrylic hardeners or polymerized UV-C photoreactive groups in side chains.

7. The adhesive tape according to claim 1, wherein the adhesive coating is comprised of an acrylate or acetate adhesive and the same hot-melt adhesive as the adhesive connection layer.

8. The adhesive tape according to claim 1, wherein the adhesive coating has a basis weight in the range of from 50 g/m² to 300 g/m².

9. The adhesive tape according to claim 1, wherein thickness is in the range of 0.35 mm to 0.48 mm.

10. The adhesive tape according to claim 1, wherein the adhesive force on steel is in the range of 5.0 N/cm to 15.0 N/cm in a test according to DIN EN 1939.

11. The adhesive tape according to claim 1, wherein the adhesive force on the tape back is in the range of 4.0 N/cm to 15.0 N/cm in a test according to DIN EN 1939.

12. The adhesive tape according to claim 1, wherein the tape has an unwinding force in the range of 2 N to 10 N in a test according to DIN EN 1944.

13. The adhesive tape according to claim 1, wherein the tape has a tensile strength in the range of 300 N/cm to 600 N/cm, in a test according to DIN EN 14410.

14. The adhesive tape according to claim 1, wherein the tape has an elongation at break that is greater than 20% in a test according to DIN EN 14410.

15. The adhesive tape according to claim 1, wherein the tape has an abrasion resistance in the range of 7500 to 9200 strokes as determined on a 5 mm mandrel.

16. The adhesive tape according to claim 1, wherein the tape has a noise damping according to LV 312 of at least class B, and a noise damping in the range 2 dB (A) to 5 dB (A) according to LV 312.

17. The adhesive tape according to claim 1, wherein the substrate is calendered and is laminated, so that the air permeability of the fabric is less than 200 l/m²s, measured according to DIN 53 887 at a test pressure of 500 Pa.

18. The adhesive tape according to claim 1, wherein in the fabric of the first textile layer or in the fabric of the second textile layer the warp threads and the weft threads are respectively designed identically.

19. The adhesive tape according to claim 1, wherein in the fabric of the first textile layer or in the fabric of the second textile layer the warp threads or the weft threads are textured.

20. The adhesive tape according to claim 1, wherein in the fabric of the first textile layer or in the fabric of the second textile layer the warp threads and/or the weft threads are intermingled, wherein there are 82 to 96 intermingling points per meter.

21. The adhesive tape according to claim 1, wherein in the substrate there is one of the color combinations black/black, black/white, and white/white for the textile layers.

22. The adhesive tape according to claim 1, wherein the fabric of the first textile layer or the fabric of the second textile layer each have a basis weight of approximately 130 g/m².

23. The adhesive tape according to claim 1, wherein the thickness is in the range of 0.44 mm to 0.46 mm.

24. The adhesive tape according to claim 1, wherein the adhesive force on steel is in the range of 7.5 N/cm to 9.0 N/cm in a test according to DIN EN 1939.

25. The adhesive tape according to claim 1, wherein the adhesive force on the tape back is in the range of 5.5 N/cm to 8.0 N/cm in a test according to DIN EN 1939.

26. The adhesive tape according to claim 1, wherein the tape has an unwinding force in the range of 3 N to 7 N in a test according to DIN EN 1944.

27. The adhesive tape according to claim 1, wherein the tape has a tensile strength in the range of 370 N/cm to 421 N/cm in a test according to DIN EN 14410.

28. The adhesive tape according to claim 1, wherein the tape has an elongation at break that is in the range of 23 percent to 31 percent in a test according to DIN EN 14410.

29. The adhesive tape according to claim 1, wherein the laminate adhesion force determined according to DIN 1939 between the first textile layer and the second textile layer of the substrate falls in the range of 12 N/cm to 15 N/cm.

30. The adhesive tape according to claim 1, wherein the substrate is calendered and is laminated, so that the air permeability of the fabric is in the range of 50 l/m²/s to 200 l/m²/s measured according to DIN 53 887 at a test pressure of 500 Pa.

31. The adhesive tape according to claim 1, wherein in the fabric of the first textile layer or in the fabric of the second textile layer the warp threads or weft threads respectively have the linear density of about 167 dtex.

32. The adhesive tape according to claim 1, wherein the number of filaments is about 36 filaments.

33. The adhesive tape according to claim 1, wherein the substrate comprises 45 warp threads and 25 weft threads.

* * * * *